(12) United States Patent
Manry et al.

(10) Patent No.: US 7,629,921 B1
(45) Date of Patent: Dec. 8, 2009

(54) RESONANCE CONFOCAL IMAGING OF RESONANCE CONTROL POINTS

(75) Inventors: Charles Manry, Auburn, WA (US);
John W. Rockway, San Diego, CA (US); John D. Rockway, San Diego, CA (US); Akira Ishimaru, Bellevue, WA (US); Yasuo Kuga, Seattle, WA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 926 days.

(21) Appl. No.: 10/872,129

(22) Filed: Jun. 18, 2004

(51) Int. Cl.
*G01S 13/89* (2006.01)
(52) U.S. Cl. .................................................. 342/179
(58) Field of Classification Search ............... 342/179
See application file for complete search history.

(56) References Cited

U.S. PATENT DOCUMENTS

| | | | | |
|---|---|---|---|---|
| 5,140,331 A | * | 8/1992 | Aulenbacher et al. | 342/165 |
| 5,262,781 A | * | 11/1993 | Evans | 342/25 F |
| 5,534,873 A | * | 7/1996 | Weichman et al. | 342/165 |
| 7,019,681 B1 | * | 3/2006 | Pellett et al. | 342/13 |

OTHER PUBLICATIONS

Rockway et al. "Resonant Confocal Imaging (RCI) of Resonant Spatial Current Modes of Structures in the Resonant Region". Presented at the National Radio Science Meeting, Boulder, Colorado. Jan. 4-8, 1999.*
Akira Ishimaru, et al. An Imaging Technique Using Confocal Circular Synthetic Aperture Radar, IEEE Transactions On Geoscience and RemoteSensing, vol. 36, No. 5 Sep. 1998.

* cited by examiner

*Primary Examiner*—Thomas H Tarcza
*Assistant Examiner*—Matthew M Barker
(74) *Attorney, Agent, or Firm*—Kyle Eppele; Allan Y. Lee; J. Eric Anderson

(57) ABSTRACT

A resonance confocal imaging of resonance control points method and system. The method includes receiving a far-field scattered response from a structure. The method further includes determining resonant frequencies from said far-field scattered response. Then, determining resonant control points of said structure from said far-field scattered response at the resonant frequencies.

13 Claims, 3 Drawing Sheets

RESONANCE CONFOCAL IMAGING OF RESONANCE CONTROL POINTS

BACKGROUND OF THE INVENTION

The present invention is generally in the field of detection and imaging.

Typical detection techniques (e.g., radar) use radiation to detect the presence of targets.

Radar has been used from its inception to locate targets and track their direction and velocity. The response to conventional radar is described in terms of optical scattering, because the target is usually large in terms of the radar wavelengths. Thus, stealth techniques can make use of shaping and radar absorbing materials to reduce the radar response of the military platform. Recent advances in stealth technology have increased interest in lower frequency radars and impulse radars. Both of these radars can exploit the resonant response of targets. A need exists to mitigate or modify the resonant response of stealth and/or complex platforms.

DETAILED DESCRIPTION OF THE INVENTION

Figure 1:
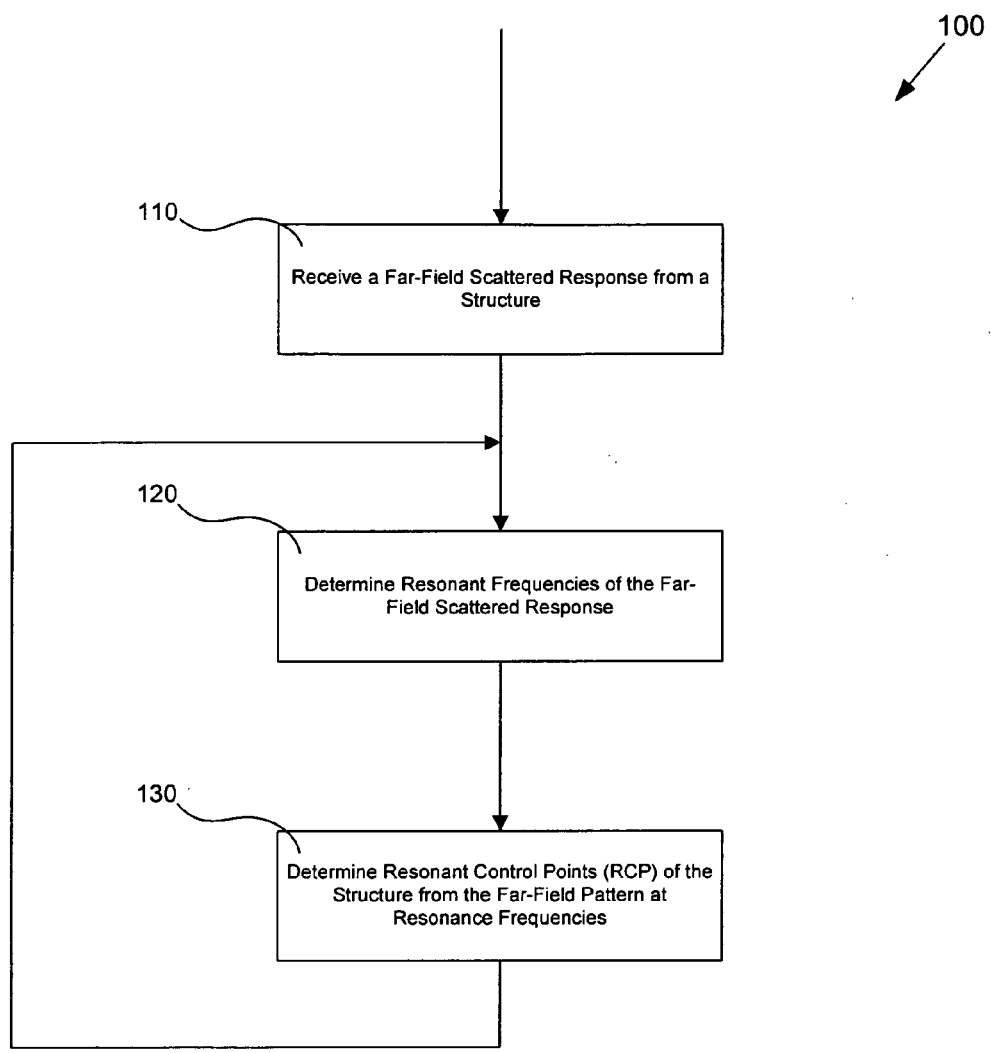
FIG. 1 is a flowchart of an exemplary application of the present invention.

The present invention is directed to detection and imaging techniques. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention that use the principles of the present invention are not specifically described in the present application and are not specifically illustrated by the present drawings.

DEFINITIONS

The following definitions and acronyms are used herein:

Acronym(s)

RCI—Resonance Confocal Imaging

RCP—Resonance Control Point

RCIRCP—Resonance Confocal Imaging of Resonance Control Points

FF—Far Field

FFSR—Far-Field Scattered Response

CEM—Computational ElectroMagnetics

RADAR—RAdio Detecting And Ranging

Definition(s)

Resonance Control Points—locations of peak currents of resonant spatial current modes.

Scatterer—a structure that is illuminated by an electromagnetic field that results in a scattered electromagnetic field.

The present inventive imaging technique identifies complex structures based, on reflected radiation (e.g., scattered far field radiation) by imaging resonant spatial current modes of the complex structures. In one embodiment, the measured or computed scattered field is used to identify the resonance control points of a complex platform. In one embodiment, these resonance control points can be used to control the scattering and radiation characteristics of the complex platform in the resonant region. The present invention is particularly useful in long-range surveillance, detection and identification.

The currents flowing on a target produce the scattered far field from the target. The currents producing the scattered field of a complex target originate primarily at centers of high current sources located on the body of the target. These high current sources may be discontinuities such as edges, high scattering centers such as corners and resonant spatial current modes. In the low frequency and resonant region of a structure, the major contributor to the radiated far-field of a structure or scattered far-field response of a structure is the result of resonant spatial current modes. Identification and location of these resonant spatial current modes provide a means of understanding and controlling the effect of a structure on radiation or scattering.

The present inventive resonance confocal imaging of resonance control points (RCIRCP) technique images resonant spatial current modes of complex structures. In one embodiment, electrically small- and medium-sized structures require only a few resonant spatial current modes to characterize radiation and scattering over several resonant frequency bands. Resonant scattered frequencies can be determined from the peak response of a structure when considering the far field scattering of a structure. At resonant scattered frequencies, responses result from only a small number of resonant spatial current modes. By imaging the far field spectrum using the resonant confocal imaging at peak response (i.e., resonant frequency), spatial modes that contribute to the scattered field are imaged. Resonant control points (RCP) are locations of peak currents of these resonant spatial current modes.

FIG. 1 is a flowchart of an exemplary method of implementing an embodiment of the present invention. Certain details and features have been left out of flowchart 100 of FIG. 1 that are apparent to a person of ordinary skill in the art. For example, a step may consist of one or more sub-steps or may involve specialized equipment or materials, as known in the art. While STEPS 110 through 130 shown in flowchart 100 are sufficient to describe one embodiment of the present invention, other embodiments of the invention may utilize steps different from those shown in flowchart 100.

Referring to FIG. 1, at STEP 110 in flowchart 100, the method receives a far-field scattered response from a structure over a frequency range from below first resonance through several resonances. In one embodiment, the method uses low-frequency radar to receive a FFSR from a structure. In one embodiment, the method uses a computational method to determine the scattered response. In an exemplary numerical computation embodiment, the method uses a computational electromagnetics (CEM) approach such as, for example, method of moments, finite element and finite difference time-domain approaches. In one embodiment, the scattered fields are developed using measurement. In an exemplary measurement embodiment, the method obtains measurements from a time-domain measurement facility. In another exemplary measurement embodiment, the method obtains measurements from a frequency-domain measurement facility. After STEP 110, the method of flowchart 100 of FIG. 1 proceeds to STEP 120.

Figure 3:
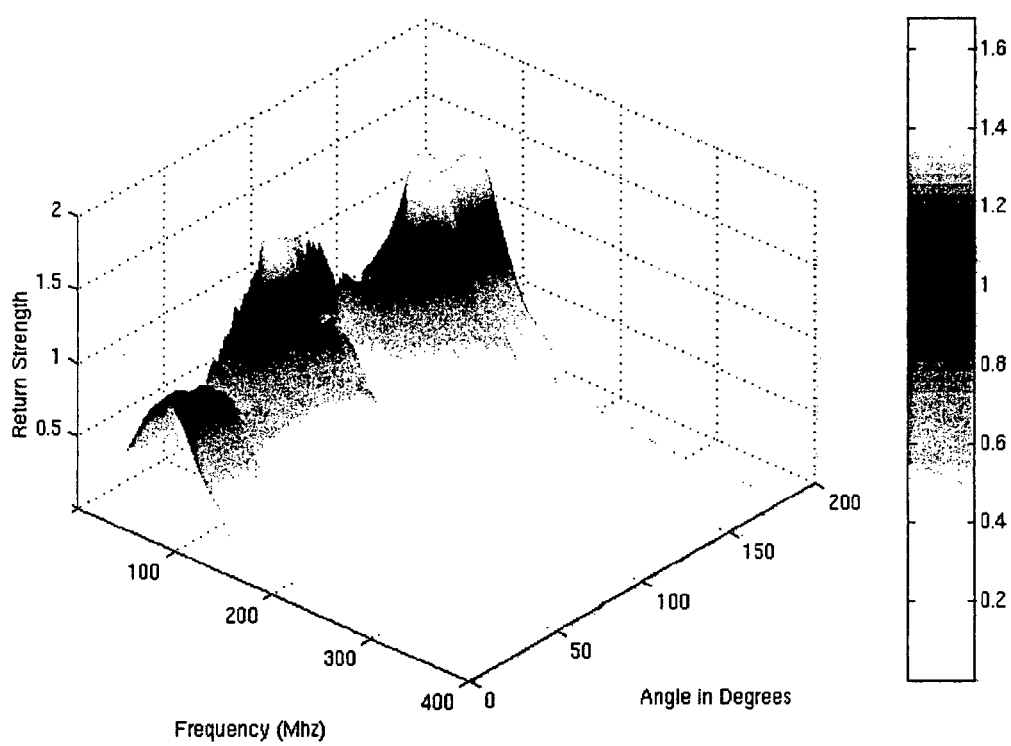
FIG. 3 is a three-dimensional plot of a scattered field as a function of frequency and incident angle.

At STEP 120 in flowchart 100, the method determines the resonant frequencies of the far-field scattered response. The method develops; a three-dimensional plot of the scattered field as a function of frequency and incident angle, as shown in FIG. 3. In the three-dimensional plot, scattered field peaks are defined as occurring at resonant frequencies. After STEP 120, the method proceeds to STEP 130.

At STEP 130 in flowchart 100, the method determines resonant control points (RCP) of the structure from the scattered field determined at STEP 110 at the resonant frequencies determined at STEP 120. In one embodiment, the method uses a computer to determine RCP of the structure. Resonant confocal imaging (RCI) is used to determine RCP of the structure. RCI is used to determine equivalent far field (FF) currents at known point locations on the scatterer. These FF currents are separate from the total current that gives rise to both near fields and far fields. At resonant scattering frequencies, peaks of FF currents indicate resonant control points. In one embodiment, only $\theta$ and $\phi$ components of magnetic vector potential $\overline{A}$ contribute to a far field. The relationship between the electrical field in the far field and the magnetic vector potential $\overline{A}$ can be represented by Equations 1 and 2.

$$E_\phi \approx i\omega A_\phi \quad \text{(Equation 1)}$$

where,
- $E_\phi = \phi$ component of the electrical field of the far field
- i=representation of an imaginary number
- $\omega = 2\pi f$ where, f is frequency
- $A_\phi = \phi$ component of magnetic vector potential $\overline{A}$ $$E_\theta \approx i\omega A_\theta \quad \text{(Equation 2)}$$

where,
- $E_\theta = \theta$ component of the electrical field of the far field
- i=representation of an imaginary number
- $\omega = 2\pi f$ where, f is frequency
- $A_\theta = \theta$ component of magnetic vector potential $\overline{A}$ The relationship between current moment IL and magnetic vector potential $\overline{A}$ can be represented by Equation 3.

$$\overline{A} = \frac{IL}{4\pi} \times \left(\frac{e^{ikr}}{r}\right) \times (a\hat{u}_r + b\hat{u}_\phi + c\hat{u}_\phi) \quad \text{(Equation 3)}$$

where,
- $\overline{A}$=magnetic vector potential
- IL=current moment
- i=representation of an imaginary number
- $k=2\pi/\lambda$ where, $\lambda$ is the wavelength
- r=distance from the current moment to the observation point of the scattered field
- $\hat{u}_r, \hat{u}_\phi, \hat{u}_\theta$=unit vectors for a spherical coordinate system
- a, b, c=are the directional cosines of the inner product of the vector r and the vector k and $\sqrt{a^2+b^2+c^2}=1$ The method at STEP 130 can determine currents on an arbitrarily oriented current moment from a scattered field using Equations 4 and 5, which focus a component of a scattered field at a constant radius to a point on the scatterer.

$$4\pi L I_\phi = \int \int E_\phi e^{-ikr} r d\phi' d\theta' \quad \text{(Equation 4)}$$

where,
- $LI_\phi$=the phi component of the current moment
- $E_\phi$=phi component of the electrical field of scattered far field
- i=representation of an imaginary number
- $k=2\pi/\lambda$ where, $\lambda$ is the wavelength $$4\pi L I_\theta = \int \int E_\theta e^{-ikr} r d\phi' d\theta' \quad \text{(Equation 5)}$$

where,
- $LI_\theta$=the theta component of the current moment
- $E_\theta$=theta component of the electrical field of scattered far field
- i=representation of an imaginary number
- $k=2\pi/\lambda$ where, $\lambda$ is the wavelength The method at STEP 130 can be used to image the currents on complex structures. Using the above two equations, the currents as arbitrarily oriented current moments can be calculated from the scattered field. This approach can be extended to a complex structure. The far field is focused to points on the complex structure, and the far field current is constructed from the Resonant Confocal Imaging process. The current peaks are the locations of the Resonant Control Points. These resonance control points can be used to control the scattering and radiation characteristics of the scatterer. Control takes the form of appropriate loading of these Resonant Control Points. The number of points on the geometry defines the quality of the image. In one embodiment, the quality of the image is also dependent on the extent of far field data that is available for imaging. In one embodiment, increased scattered field data results in increased image quality. After STEP 130, the method of flowchart 100 of FIG. 1 proceeds to STEP 120 for further determination of resonant frequencies.

In a canonical embodiment, the method in flowchart 100 of FIG. 1 determines structures analytically. In a complex structure embodiment, the method in flowchart 100 of FIG. 1 determines structures numerically. In an exemplary complex structure embodiment, the method uses the Harrington and Mautz characteristic mode formulation to determine spatial modes via an eigenvalue formulation of a method of moments matrix.

Figure 2:
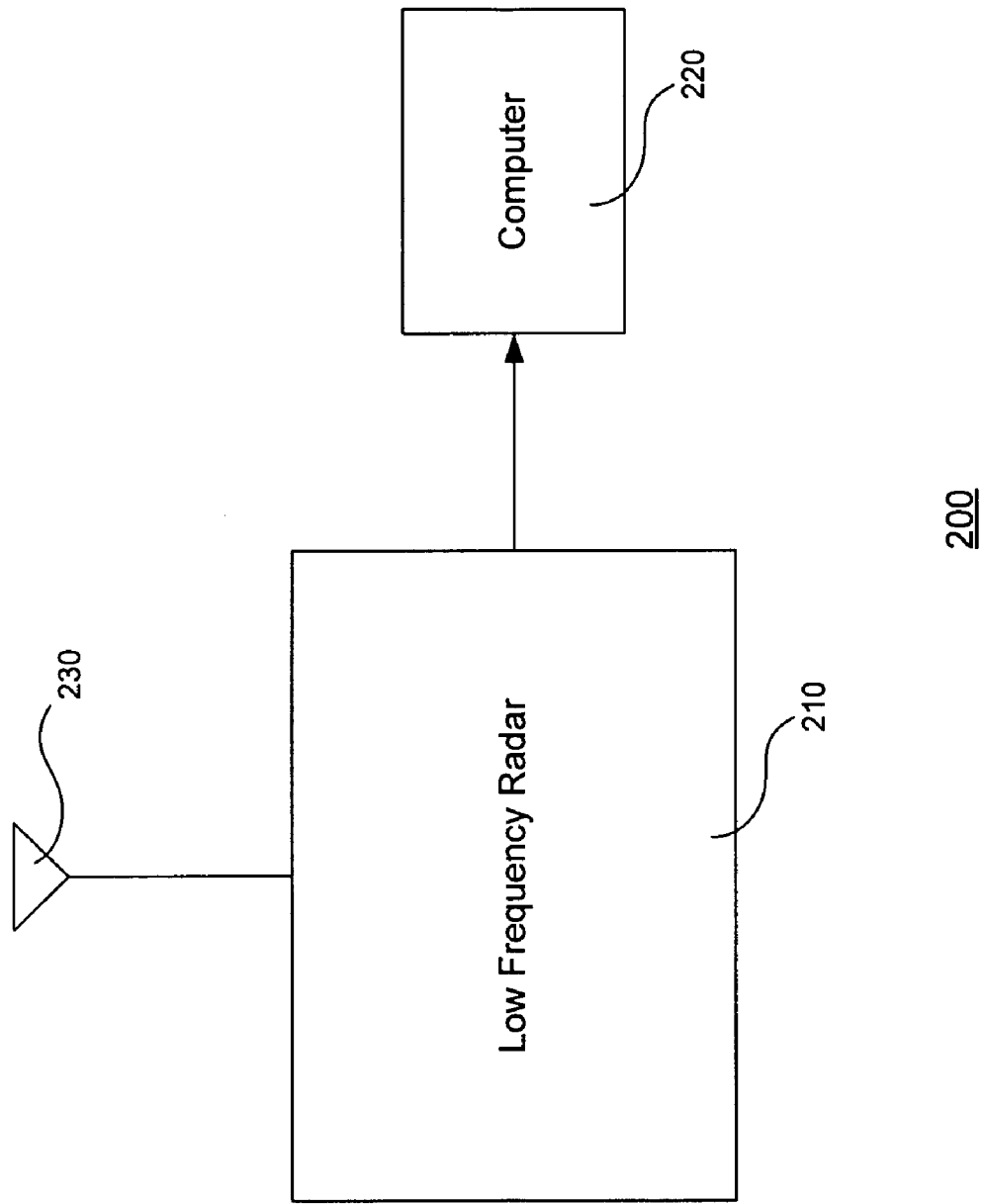
FIG. 2 is a block diagram of one embodiment of the present invention.

FIG. 2 is a block diagram of an exemplary RCIRCP system that can be used to implement an embodiment of the present invention. As shown in FIG. 2, RCIRCP system 200 includes low-frequency radar 210, computer 220 and antenna 230. Antenna 230 is operatively coupled to low-frequency radar 210. Antenna 230 is capable of transmitting and receiving low-frequency signals. Low-frequency radar 210 is capable of transmitting and receiving low-frequency signals to antenna 230. Low-frequency radar 210 is operatively coupled to computer 220. Computer 220 is capable of receiving far-field scattered responses from low-frequency radar 210 and imaging the far field spectrum using the resonant confocal imaging at peak response according to the method in flowchart 100 of FIG. 1.

From the above description of the invention, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

We claim:

1. A method for resonance confocal imaging of resonance control points (RCIRCP), the method comprising the steps of:
   a) receiving a far-field scattered response from a structure over a frequency band from below first resonance through several resonances;
   b) determining resonance frequencies from said far-field scattered response;
   c) determining resonant control points of said structure from said far-field scattered response at resonance frequencies;
   d) returning to said determining resonance frequencies step (b).

2. The method of claim 1, wherein said receiving said far-field scattered response from said structure STEP (a) comprises receiving a far-field scattered response from a structure using a low-frequency radar.

3. The method of claim 1, wherein determining said resonance frequencies from said far-field scattered response STEP (b) comprises developing a three-dimensional plot of a scattered field as a function of frequency and incident angle.

4. The method of claim 3, wherein said far-field scattered response is developed using canonical analysis.

5. The method of claim 3, wherein said far-field scattered response is developed using numerical computation.

6. The method of claim 5, wherein said numerical computation is a computational electromagnetics approach.

7. The method of claim 6, wherein said computational electromagnetics approach is a method selected from the group consisting of method of moments, finite element and finite difference time-domain.

8. The method of claim 3, wherein said far-field scattered response is developed using a measurement.

9. The method of claim 8, wherein said measurement is obtained from a time-domain measurement facility.

10. The method of claim 8, wherein said measurement is obtained from a frequency-domain measurement facility.

11. The method of claim 1, wherein determining resonant control points of said structure from said far-field scattered response at said resonant frequency STEP (b) uses the following equations:

$$4\pi L I_\phi = \int \int E_\phi e^{-ikr} r d\phi d\theta; \text{ and}$$

$$4\pi L I_\theta = \int \int E_\theta e^{-ikr} r d\phi d\theta.$$

12. A resonance confocal imaging of resonance control points system, comprising:
   a) means for receiving a far-field scattered response from a structure;
   b) means, operatively coupled and responsive to said means for receiving a far-field scattered response, for determining resonance frequencies from said far-field scattered response;
   c) means, operatively coupled and responsive to said means for receiving said far-field scattered response, for determining resonant control points of said structure from said far-field pattern at resonance frequencies.

13. A resonance control points imaging system, comprising:
   a) a time domain measurement facility configured to measure a far-field scattered response from a structure over a frequency range from below a first resonance through several resonances; and
   b) a computer, operatively coupled to said time domain measurement facility and configured to image said resonance control points from said measured far-field scattered response, wherein said computer further comprises:
      i) means for determining resonant frequencies from said far-field scattered response; and
      ii) means, operatively coupled and responsive to said means for determining said resonant frequencies, for determining resonant control points of said structure from said associated far-field scattered responses at resonance frequencies.

* * * * *